(12) United States Patent
Kato et al.

(10) Patent No.: US 8,837,976 B2
(45) Date of Patent: Sep. 16, 2014

(54) SUB POWER SOURCE-TYPE ELECTRONIC DEVICE AND IMAGE FORMING APPARATUS

(71) Applicant: Oki Data Corporation, Tokyo (JP)

(72) Inventors: Koji Kato, Tokyo (JP); Yoichi Hayakawa, Tokyo (JP); Tatsuho Yoshida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 44 days.

(21) Appl. No.: 13/716,262

(22) Filed: Dec. 17, 2012

(65) Prior Publication Data

US 2013/0164019 A1  Jun. 27, 2013

(30) Foreign Application Priority Data

Dec. 26, 2011 (JP) ................. 2011-283131

(51) Int. Cl.
G03G 15/02 (2006.01)
G03G 15/00 (2006.01)
H02J 4/00 (2006.01)
H02J 9/00 (2006.01)

(52) U.S. Cl.
CPC . *H02J 4/00* (2013.01); *G03G 15/80* (2013.01); *H02J 9/005* (2013.01)
USPC ............................................. 399/88; 399/70

(58) Field of Classification Search
USPC .................................................... 399/88, 70
See application file for complete search history.

(56) References Cited

U.S. PATENT DOCUMENTS

| | | | | | |
|---|---|---|---|---|---|
| 4,593,323 A | * | 6/1986 | Kanda et al. | ............. | 379/100.01 |
| 5,036,261 A | * | 7/1991 | Testin | ........................... | 315/411 |
| 5,331,354 A | * | 7/1994 | Koyama et al. | ............... | 348/730 |
| 5,686,767 A | * | 11/1997 | Helfrich et al. | .................. | 307/64 |
| 5,929,943 A | * | 7/1999 | Bell et al. | ....................... | 348/730 |
| 6,092,207 A | * | 7/2000 | Kolinski et al. | ............... | 713/323 |
| 6,097,378 A | * | 8/2000 | Song | ............................. | 345/211 |
| 6,105,143 A | * | 8/2000 | Kim | ............................. | 713/324 |
| 6,708,279 B1 | * | 3/2004 | Takenaka | ...................... | 713/324 |
| 8,181,052 B2 | * | 5/2012 | Lin | ............................. | 713/323 |
| 2009/0041438 A1 | * | 2/2009 | Kuno | ............................. | 386/126 |
| 2009/0287945 A1 | * | 11/2009 | Kim et al. | ..................... | 713/323 |
| 2010/0231807 A1 | * | 9/2010 | Sakai et al. | ................... | 348/730 |
| 2011/0239028 A1 | * | 9/2011 | Higuma et al. | ............... | 713/340 |
| 2012/0092897 A1 | * | 4/2012 | Hara et al. | ....................... | 363/16 |
| 2012/0272084 A1 | * | 10/2012 | Tsuji | ............................. | 713/324 |
| 2013/0166926 A1 | * | 6/2013 | Yamamizu | .................... | 713/300 |

FOREIGN PATENT DOCUMENTS

| | | |
|---|---|---|
| JP | 63-163914 A | 7/1988 |
| JP | 05-094237 A | 4/1993 |
| JP | 2003-067171 A | 3/2003 |
| JP | 2003-167651 A | 6/2003 |

* cited by examiner

*Primary Examiner* — G. M. Hyder

(74) *Attorney, Agent, or Firm* — Muncy, Geissler, Olds & Lowe, P.C.

(57) ABSTRACT

An electronic device includes a first voltage output part configured to output a first voltage, a second voltage output part configured to output a second voltage, a first controller configured to receive the first voltage supplied from the first voltage output part, a second controller configured to receive the first voltage supplied from the first voltage output part, and a third controller configured to receive the second voltage supplied from the second voltage output part. The first controller stops the supply of the first voltage to the second controller by the first voltage output part after the supply of the second voltage to the third controller by the second voltage output part has been stopped.

20 Claims, 13 Drawing Sheets

Schematic Circuit View of Printer According To First Embodiment

Fig. 1  Schematic Circuit View of Printer According To First Embodiment

State Transition Diagram of Operation of Power-Off Control Part in Fig. 1

Fig. 7

Timing Chart of Auto-Off Operation of Printer in Fig. 1

| Printer 1 | | Apparatus State | ON Mode | Deep Sleep Mode | OFF Mode Transition | OFF Mode |
|---|---|---|---|---|---|---|
| | | | | | ▽ Auto-off Time Passed | |
| | Power Source | Main Voltage 24V,5V | Supply | 5V, 24V Stoppage | | 5V, 24V Stoppage |
| | | Main Voltage 3.3V | Supply | 3.3V Stoppage | | 3.3V Stoppage |
| | | Sub Voltage 3.3VS0 | Supply | Supply | Supply | |
| | | Sub Voltage 3.3VS | Supply | Supply | Supply | 3.3VS Stoppage |
| | Power-Saving Control Part 30 | AUTOOFF_OK-P | "L" Output | "L" Output | "H" Output | OFF State |
| | | POWER_SAVE-N | "H" Output | "L" Output | "L" Output | OFF State |
| | Power-off Control Part 20 | Power Source Switch 3 | Non-Depression | Non-Depression | | |
| | | OFFMODE-P | "L" Output | "L" Output | "L" Output | "L" Output |
| | | SUBPWRON-N | "L" Output | "L" Output | "L" Output | "H" Output |
| | | Power Source Switch LED 4 | Turned ON | Turned ON | Turned On And Off | Turned OFF |
| | | | T31 | T32 T33 | T34 T35 | T36 T37 → T |

Schematic Circuit View of Printer According To Second Embodiment of Present Invention Flow Diagram of Operation of Power-Saving Control Part in Fig. 8

Schematic Circuit View of Printer According To Second Embodiment of Present Invention Fig. 12  Timing Chart of Power-Source-Off Operation During Deep Sleep Mode of Printer in Fig. 8

Timing Chart of Auto-Off Operation of Printer in Fig. 8

SUB POWER SOURCE-TYPE ELECTRONIC DEVICE AND IMAGE FORMING APPARATUS

CROSS REFERENCE TO RELATED APPLICATION

The present application is related to, claims priority from and incorporates by reference Japanese Patent Application No. 2011-283131, filed on Dec. 26, 2011.

TECHNICAL FIELD

The present invention relates to an electronic device with a sub power source type power source for power-saving and an image forming apparatus.

BACKGROUND

Conventionally, for the sake of power-saving in an electronic device such as a personal computer and the like, a sub power source type electronic device is known in which a main voltage is supplied from a main power source during operation of the electronic device. The main power source is turned off and a small amount of sub voltage is supplied by a sub power source when the electronic device does not constantly operate for a certain period of time (JP Patent No. 2,997,584).

However, in the above conventional electronic device with the sub power source type power source for power-saving, there is a problem that a power circuit becomes complicated in a case where an auto power-off function is added that automatically switches a current-application state to the apparatus. Therefore, it is desired to add the auto power-off function with a simple configuration to such an electronic device with the sub power source and the main power source.

SUMMARY

Considering the above desire, an electronic device disclosed in the application includes a first voltage output part configured to output a first voltage, a second voltage output part configured to output a second voltage, a first controller configured to receive the first voltage supplied from the first voltage output part, a second controller configured to receive the first voltage supplied from the first voltage output part, and a third controller configured to receive the second voltage supplied from the second voltage output part. The first controller stops the supply of the first voltage to the second controller by the first voltage output part after the supply of the second voltage to the third controller by the second voltage output part has been stopped.

In another view of the invention, an electronic device disclosed in the application includes an first voltage output part configured to convert a power source voltage to a first device voltage, a first controller configured to be operable upon receiving the first voltage, a second controller in communication with the first controller and configured to be operable upon receiving the first voltage, a second voltage output part configured to convert the power source voltage to a second voltage, and a third controller configured to be operable upon receiving the second voltage and to control an ON mode. The first controller and the second controller together configured to control an OFF mode and a deep sleep mode, and being configured to stop the first voltage output by the first voltage output part to the second controller after the second controller stops the second voltage output to the third controller.

According to the electronic device of the present invention, the first controller stops the first voltage supplied to the second controller by the first voltage output part after the second voltage supplied to the third controller by the second voltage output part has been stopped. Therefore, there is an effect in which the auto power-off function is realized with the simple configuration.

BRIEF DESCRIPTION OF THE DRAWINGS

FIG. 4 is a timing chart of an operation after a power source of the printer in FIG. 1 is turned on.

FIG. 7 is a timing chart of an auto-off operation of the printer in FIG. 1.

FIG. 10 is a timing chart of an operation after a power source of the printer in FIG. 8 is turned on.

DESCRIPTION OF EMBODIMENTS

The electronic device and the image forming apparatus will become more readily understood when read in light of the explanation of preferred embodiments and accompanying drawings. However, the drawings are for explanation purposes only and are not intended to limit the scope of the invention.

[First Embodiment]

(Configuration of First Embodiment)

Figure 1:
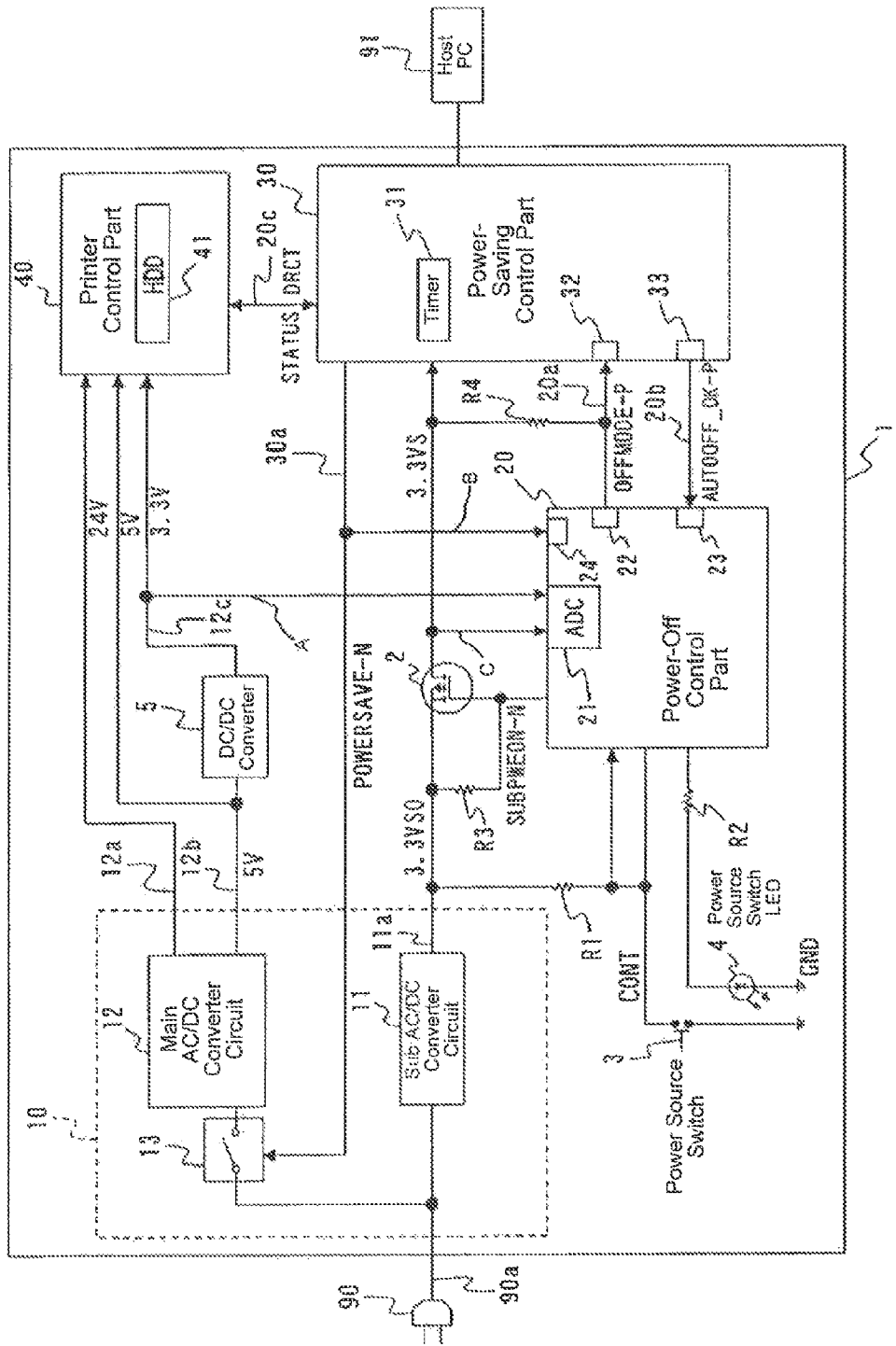
FIG. 1 is a schematic circuit view of an electronic device (e.g. printer) according to a first embodiment of the present invention.

FIG. 1 is a schematic circuit view of an electronic device (e.g. printer) 1 according to a first embodiment of the present invention.

The printer 1 includes a constant voltage power source 10 that converts an alternating current (hereinafter referred to as "AC") voltage 90a supplied from an AC power source 90 to a direct current (hereinafter referred to as "DC") voltage and that supplies the voltage, a first controller (e.g. power-off control part) 20 that controls an auto power-off of the power source, a second controller (e.g. power-saving control part) 30 that cooperates with the power-off control part 20 to perform a power-saving control, a third controller (e.g. printer control part) 40 to which predetermined voltages are supplied from the constant voltage power source 10 and which controls various circuits and various functional parts that are various mechanisms of the printer 1 (not shown). The printer control part 40 includes a hard disk drive (hereinafter referred to as "HDD") 41 that is a nonvolatile memory that stores various control information and the like.

The printer control part 40 is a controller that controls an image forming part that forms a toner image, a transfer part that transfers the toner image formed in the image forming part, a fuser part that fixes the toner image transferred on a medium, and carrying part that carries the medium and the like (not shown), and is a main controller to which a main voltage converted by a main analog-to-digital (AC/DC) converter circuit 12 is supplied.

The constant voltage power source 10 includes a first voltage output part (e.g. sub AC/DC converter circuit) 11 that converts the AC voltage 90a to first voltages (e.g. a 3.3V sub voltage) that are DC voltages and outputs the first voltages to a signal line 11a, a second voltage output part (e.g. main AC/DC converter circuit) 12 to which AC voltage 90a is supplied from the AC power source 90 through a second supply part (e. g relay circuit) 13, and which converts the voltage to second voltages (e.g. main 24V and 5V voltages) that are DC voltages, and which supplies to the printer control part 40 through the signal lines 12a and 12b. The signal line 12b branches and is connected to a DC/DC converter 5. The DC/DC converter 5 converts the 5V main voltage to the 3.3V main voltage, and supplies the voltage to the printer control part 40 thorough the signal line 12c.

The signal line 11a connected to the sub AC/DC converter circuit 11 is connected to a source of a P channel field-effect transistor (hereinafter referred to as "PchFET") 2 that is a first supply part, and to a gate of the PchFET 2 through a resistor R3. The gate of the PchFET 2 is connected to the power-off control part 20. A drain of the PchFET 2 is connected to the power-saving control part 30 and an analog-digital converter (hereinafter referred to as "ADC") 21 as an input part of the power-off control part 20.

Here, expressions of the sub voltages and the main voltages are defined as described below. The 3.3V sub voltage that the sub AC/DC converter circuit 11 outputs to the signal line 11a is expressed as sub voltage 3.3VS0. The 3.3V sub voltage input from the signal line 11a to the power-saving control part 30 is expressed as sub voltage 3.3VS. The 24V and 5V main voltages are expressed as main voltages 24V and 5V. The 3.3V main voltage is expressed as main voltage 3.3V.

The power-off control part 20 is a controller of which consumed power is smaller than that of the power-saving control part 30, and a sub control part to which the sub voltage converted by the sub AC/DC converter circuit 11 is supplied.

The power-off control part 20 includes the ADC 21 that detects a change of voltage, a sending part 22 that outputs a request signal OFFMODE-P to the signal line 20a that is a first notification part, and a receiving part 23 that receives a permission signal AUTOOFF_OK-P through the signal line 20b that is a first instruction part. The request signal OFFMODE-P is a signal that requests stoppage of the main voltages and is an output specification of an open drain that is pulled up to 3.3VS by a resistor R4.

The power-off control part 20 outputs a first switching signal SUBPWRON-N to the gate of the PchFET 2. The first switching signal SUBPWRON-N is an output specification of an open drain that is pulled up to 3.3VS0 by the resistor R3. The sub voltage 3.3VS0 is input to the source of the PchFET 2. The PchFET 2 is switched to one of two current-application states including an output state in which the input sub voltage 3.3VS0 is output as the sub voltage 3.3VS or a stop state in which the output of the sub voltage 3.3VS0 is stopped based on the first switching signal SUBPWRON-N.

When the first switching signal SUBPWRON-N is at low level (hereinafter referred to as "L"), the current-application state of the PchFET 2 is configured to be the output state (ON state). When the SUBPWRON-N is at high level (hereinafter referred to as "H"), the current-application state of the PchFET 2 is configured to be the stop state (OFF state).

One end of the power-off control part 20 is connected to an other end of the power source switch 3 that is connected to ground (GND). The other end of the power source switch 3 is connected to a resistor R1 connected to the signal line 11a, and is pulled up to 3.3VS0. When the power source switch 3 is depressed, a control signal CONT "L" is input from the power source switch 3 to the power-off control part 20, and in a state in which the power source switch 3 is not depressed, the control signal CONT "H" is input from the power source switch 3 to the power-off control part 20.

The power-off control part 20 is connected to an anode of a power source switch LED 4 that is a lamp with a light emitting diode (hereinafter referred to as "LED") through a resistor R2. A cathode of the power source switch LED 4 is connected to ground GND. When the power-off control part 20 outputs a signal "H", the power source switch LED 4 is turned on. When the power-off control part 20 outputs a signal "L," the power source switch LED 4 is turned off.

The power-saving control part 30 includes a timer 31 that clocks time, a receiving part 32 that inputs the request signal OFFMODE-P, and a sending part 33 that sends the permission signal AUTOOFF$_{13}$ OK-P that permits stoppage of the sub voltage 3.3VS0.

The power-saving control part 30 is a controller of which consumed power is smaller than that of the printer control part 40, and a sub controller to which the sub voltage is converted by the sub AC/DC converter circuit 11 is supplied.

The power-saving control part 30 is connected to a host personal computer (hereinafter referred to as "host PC") 91 that is a host computer. The power-saving control part 30 receives print job data from the host PC 91, converts the print job data into image data, and outputs the printer control part 40. The printer control part 40 outputs a state notification signal STATUS that notifies various states to the power-saving control part 30 through the signal line 20c.

A signal (second switching signal POWERSAVE-N) is input to an input part 24 of the power-off control part 20 through a signal line B that branches between the power-saving control part 30 and the relay circuit 13 from the signal line 30a. An output state of the main voltage 3.3V is input to the ADC 21 as the input part through a signal line A that branches between the DC/DC converter 5 and the printer control part 40 from the signal line 12c. An output state of the sub voltage 3.3VS is input to the ADC 21 through a signal line C that branches between the PchFET 2 and the power-saving control part 30.

The power-saving control part 30 outputs the second switching signal POWERSAVE-N to the relay circuit 13 and the power-off control part 20 through the signal line 30a. When the second switching signal POWERSAVE-N is "H," the relay circuit 13 is turned on and the AC voltage 90a is input to the main AC/DC converter circuit 12. When the second switching signal POWERSAVE-N is "L," the relay circuit 13 is turned off and the AC voltage 90a is stopped.

(Operation of First Embodiment)

Regarding supply states of power, the printer 1 includes four basic apparatus states such as an AC OFF state, an OFF mode, an ON mode and a deep sleep mode. The AC OFF state is an apparatus state in which the AC power is not supplied. The OFF mode is an apparatus state in which the supply of the main voltages 24V, 5V and the main voltage 3.3V to the printer control part 40, and supply of the sub voltage 3.3VS to the power-saving control part 30 is stopped, and only the sub voltage 3.3VS0 is supplied to the power-off control part 20.

The ON mode is an apparatus state in which the main voltages 24V, 5V and the main voltage 3.3V is supplied to the printer control part 40 and the sub voltage 3.3VS is supplied to the power-saving control part 30; moreover, the sub voltage 3.3VS0 is supplied to the power-off control part 20. In the ON mode, the printer 1 immediately operates when the printer 1 receives the print job data.

The deep sleep mode is an apparatus state in which the supply of the main voltages 24V, 5V and the main voltage 3.3V to the printer control part 40 is stopped, and the sub voltage 3.3VS is supplied to the power-saving control part 30. Moreover, the sub voltage 3.3VS0 is supplied to the power-off control part 20. In the ON mode, in the case when job is not received for a predetermined time period (e.g. 15 minutes), the power-saving control part 30 shifts the apparatus state to the deep sleep mode. In the deep sleep mode, when a reset condition from the deep sleep mode to the ON mode is ready, the supply of the main voltages 24V, 5V and the main voltage 3.3V to the printer control part 40 is resumed by the control of the power-saving control part 30, and the printer 1 operates. The reset condition includes the depression of the power source switch 3 by a user and receipt of the print job data from the host PC 91, for example.

Figure 2:
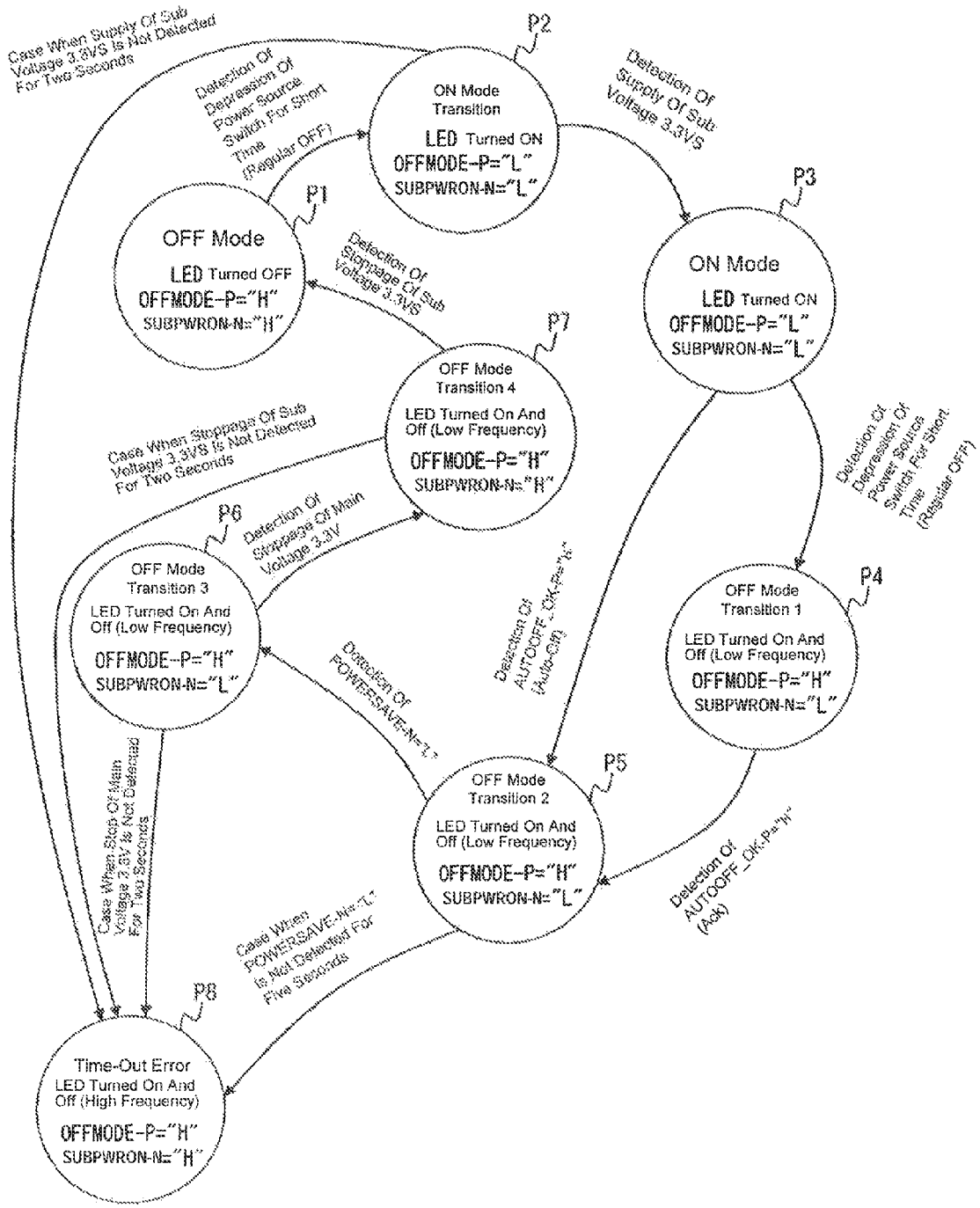
FIG. 2 is a state transition diagram of an operation of a power-off control part in FIG. 1.

FIG. 2 is a state transition diagram of an operation of the power-off control part 20 in FIG. 1. The power-off control part 20 shifts the apparatus state to an OFF mode P1 when the sub voltage 3.3VS0 is fed from the sub AC/DC converter circuit 11.

In the OFF mode P1, the power-off control part 20 turns off the power source switch LED 4, and outputs the request signal OFFMODE-P signal "H," and outputs the first switching signal SUBPWRON-N "H." As a result, the PchFET 2 is turned off. The power-off control part 20 transitions the apparatus state to an ON mode transition P2 by detecting the depression of the power source switch 3. In the OFF mode, the depression of the power source switch 3 is detected since the sub voltage 3.3VS0 is supplied to the power-off control part 20.

In the ON mode transition P2, the power-off control part 20 turns on the power source switch LED 4, outputs the request signal OFFMODE-P "L," and outputs the first switching signal SUBPWRON-N "L." As a result, the PchFET 2 is turned on and the sub voltage 3.3VS is supplied to the power-saving control part 30. The ADC 21 of the power-off control part 20 detects the supply of the sub voltage 3.3VS, and transitions the apparatus state to an ON mode P3. In the ON mode transition P2, the ADC 21 causes the apparatus state to transition to a time-out error P8 in the case when the supply of the sub voltage 3.3VS is not detected for two seconds.

In the ON mode P3, the power-off control part 20 turns on the power source switch LED 4, outputs the request signal OFFMODE-P "L," and outputs the first switching signal SUBPWRON-N "L."

In the ON mode P3, the power-off control part 20 transitions the apparatus state to an OFF mode transition 1 P4 by detecting the depression of the power source switch 3 with the control signal CONT. In the OFF mode transition 1 P4, the power-off control part 20 transitions the apparatus state to an OFF mode transition 2 P5 when the power-off control part 20 detects the permission signal AUTOOFFOK$_{13}$ OK-P "H" that permits stoppage of the sub voltage 3.3VS0.

In the OFF mode transition 1 P4, the power-off control part 20 turns on and off the power source switch LED 4 at a low frequency of 1 Hz. The power-off control part 20 outputs the request signal OFFMODE-P "H," and outputs the first switching signal SUBPWRON-N "L." In the OFF mode transition 1 P4, the power-off control part 20 transitions the apparatus state to the OFF mode transition 2 P5 by detecting the permission signal AUTOOFF_OK-P "H" that permits stoppage of the sub voltage 3.3VS0.

In the OFF mode transition 2 P5, the power-off control part 20 turns on and off the power source switch LED 4 at a low frequency of 1 Hz. The power-off control part 20 outputs the request signal OFFMODE-P "H," and outputs the first switching signal SUBPWRON-N "L." In the OFF mode transition 2 P5, the power-off control part 20 transitions the apparatus state to an OFF mode transition 3 P6 by detecting the second switching signal POWERSAVE-N "L." In the OFF mode transition 2 P5, the power-off control part 20 causes the apparatus state to transition to the time-out error P8 in the case when the second switching signal POWERSAVE-N "L" is not detected for five seconds.

In the OFF mode transition 3 P6, the power-off control part 20 turns on and off the power source switch LED 4 at a low frequency of 1 Hz. The power-off control part 20 outputs the request signal OFFMODE-P "H," and outputs the first switching signal SUBPWRON-N "L." The ADC 21 of the power-off control part 20 detects stoppage of the main voltage 3.3V, and transitions the apparatus state to an OFF mode transition 4 P7. The power-off control part 20 causes the apparatus state to transition to the time-out error P8 in the case when stoppage of the main voltage 3.3V is not detected for two seconds.

In the OFF mode transition 4 P7, the power-off control part 20 turns on and off the power source switch LED 4 at a low frequency of 1 Hz. The power-off control part 20 outputs the request signal OFFMODE-P "H," and outputs the first switching signal SUBPWRON-N "H." The power-off control part 20 transitions the apparatus state to the OFF mode P1 by detecting stoppage of the sub voltage 3.3VS. The power-off control part 20 causes the apparatus state to transition to the time-out error P8 in the case when stoppage of the sub voltage 3.3VS is not detected for two seconds.

In the time-out error P8, the power-off control part 20 turns on and off the power source switch LED 4 at a high frequency of 3 Hz. The power-off control part 20 outputs the request signal OFFMODE-P "H," and outputs the first switching signal SUBPWRON-N "H." The power-off control part 20 includes a mandatory off mode shift function, and preferentially causes the apparatus state to transition to the the OFF mode transition 4 P7 in the case when a continuous five-minute ON state, in which the power source switch 3 is depressed for a long time, is detected.

Figure 3:
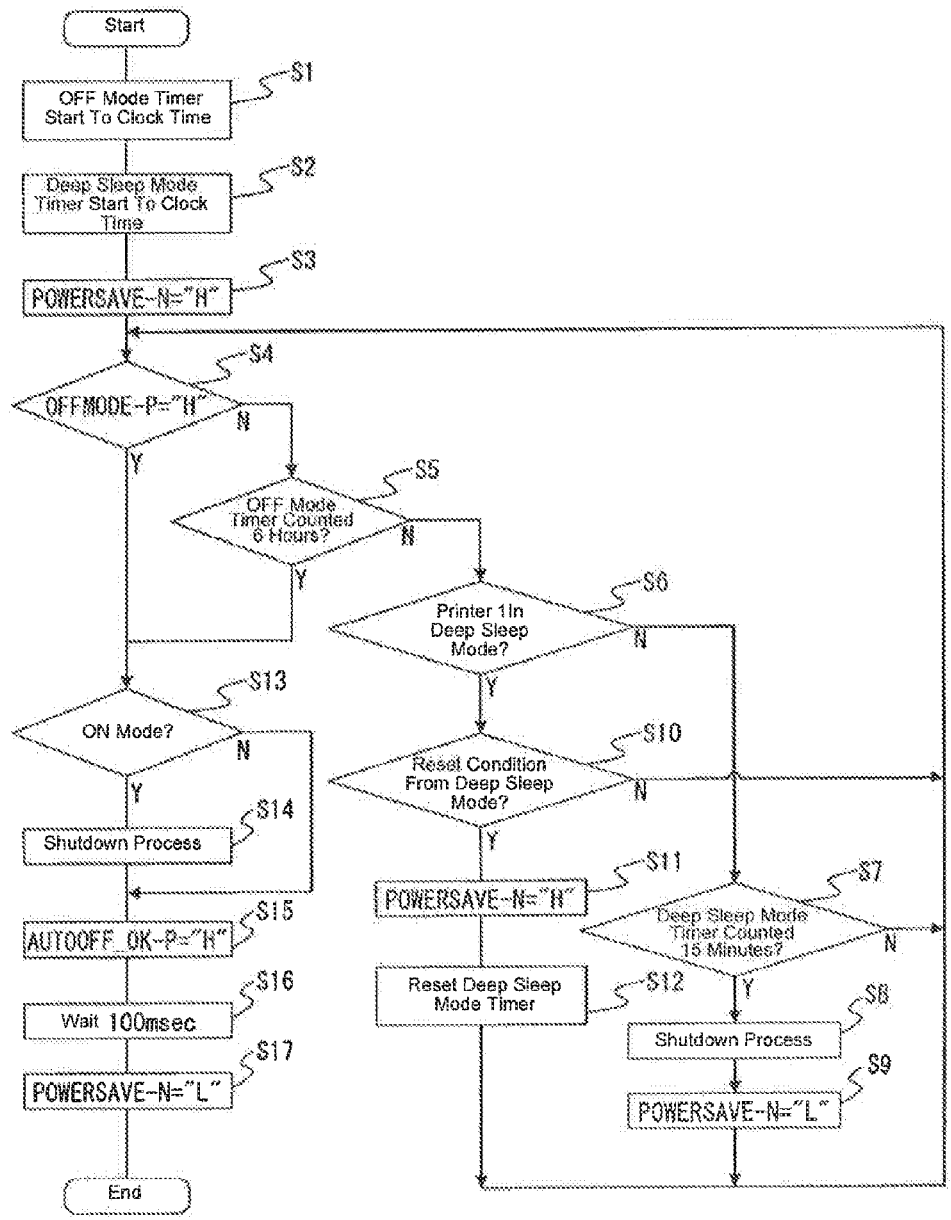
FIG. 3 is a flow diagram of an operation of a power-saving control part in FIG. 1.

FIG. 3 is a flow diagram of an operation of the power-saving control part 30 in FIG. 1. In S1, the power-saving control part 30 sets a value of an OFF mode timer of the OFF mode to 6 hours, starts to clock time with the timer 31, and shifts to S2. In S2, the power-saving control part 30 selects a value of a deep sleep mode timer of the deep sleep mode to 15 minutes, starts to clock time with the timer 31, and shifts to S3.

In S3, the power-saving control part 30 outputs the second switching signal POWERSAVE-N "H." As a result, the relay circuit 13 is turned on, and the main voltages 24V, 5V and the main voltage 3.3V are supplied to the printer control part 40. The power-saving control part 30 shifts to S4. In S4, the power-saving control part 30 performs the detection of the request signal OFFMODE-P. Stoppage of the main voltages 24V, 5V and the main voltage 3.3V is requested in the case when the request signal OFFMODE-P is "H." The power-saving control part 30 shifts to S13. The power-saving control part 30 shifts to S5 in the case when the request signal OFFMODE-P is "L."

In S5, the power-saving control part 30 judges whether or not the OFF mode timer has counted six hours, which is an auto-off condition. The power-saving control part 30 shifts to S13 in the case when the OFF mode timer has counted six hours. The power-saving control part 30 shifts to S6 in the case when the OFF mode timer has not counted six hours.

In S6, the printer control part 40 judges whether or not the printer 1 is currently in the deep sleep mode. The printer control part 40 shifts to S10 in the case when the printer 1 is in the deep sleep mode. The printer control part 40 shifts to S7 in the case when the printer 1 is not in the deep sleep mode. In S7, the printer control part 40 judges whether or not a shift condition to the deep sleep mode have been satisfied; that is, the deep sleep mode timer has counted 15 minutes. The printer control part 40 shifts to S8 in the case when the deep sleep mode timer has counted 15 minutes. The printer control part 40 returns to S4 in the case when the deep sleep mode timer has not counted 15 minutes.

In S8, the power-saving control part 30 instructs the printer control part 40 to perform a shutdown process with an instruction signal DRCT. The printer control part 40 performs the shutdown process to shunt control parameters and the like to the HDD 41 that is a nonvolatile memory, and notifies the power-saving control part 30 of the completion of the shutdown with the state notification signal STATUS. The power-saving control part 30 receives the notification of the completion of the shutdown, and shifts to S9. In S9, the power-saving control part 30 outputs the second switching signal POWERSAVE-N "L," and returns to S4. By outputting the second switching signal POWERSAVE-N "L," the relay circuit 13 is turned off, and the supply of the main voltages 24V, 5V and the main voltage 3.3V to the printer control part 40 is stopped.

In S10, satisfaction of a reset condition from the deep sleep mode to the OFF mode is judged. The reset condition to the OFF mode includes the depression of a switch of an operation panel (not shown) by the user and receipt of the print job data from the host PC 91, for example. The printer control part 40 returns to S4 when the reset condition is not satisfied. The printer control part 40 shifts to S11 when the reset condition is satisfied.

In S11, the power-saving control part 30 outputs the second switching signal POWERSAVE-N "H," and shifts to S12. By outputting the second switching signal POWERSAVE-N "H," the relay circuit 13 is turned on, and the main voltages 24V, 5V and the main voltage 3.3V are supplied to the printer control part 40. In S12, the power-saving control part 30 resets the deep sleep mode timer, and returns to S4.

In S13, the power-saving control part 30 judges whether or not the printer 1 is in the ON mode. The power-saving control part 30 shifts to S14 in the case when the printer 1 is in the ON mode. The power-saving control part 30 shifts to S15 in the case when the printer 1 is not in the ON mode. In S14, the power-saving control part 30 instructs the printer control part 40 to perform a shutdown process with an instruction signal DRCT. The printer control part 40 performs the shutdown process to shunt control parameters and the like to the HDD 41 that is a nonvolatile memory, and notifies the power-saving control part 30 of the completion of the shutdown with the state notification signal STATUS. The power-saving control part 30 inputs the state notification signal STATUS of the completion of the shutdown, and shifts to S15.

In S15, the power-saving control part 30 outputs the permission signal AUTOOFF OK-P "H" that permits stoppage of the sub voltage 3.3VS0, and shifts to S16. In S16, the power-saving control part 30 waits for 100 milliseconds. Then, the power-saving control part 30 shifts to S17. In S17, the power-saving control part 30 outputs the second switching signal POWERSAVE-N "L," and completes the process.

As a result, the relay circuit 13 is turned off, and the supply of the main voltages 24V, 5V and the main voltage 3.3V to the printer control part 40 is stopped. The power-off control part 20 detects stoppage of the main voltage 3.3V, and outputs the first switching signal SUBPWRON-N "H." As a result, the PchFET 2 is turned off and the supply of the sub voltage 3.3VS to the power-saving control part 30 is stopped.

Figure 4:
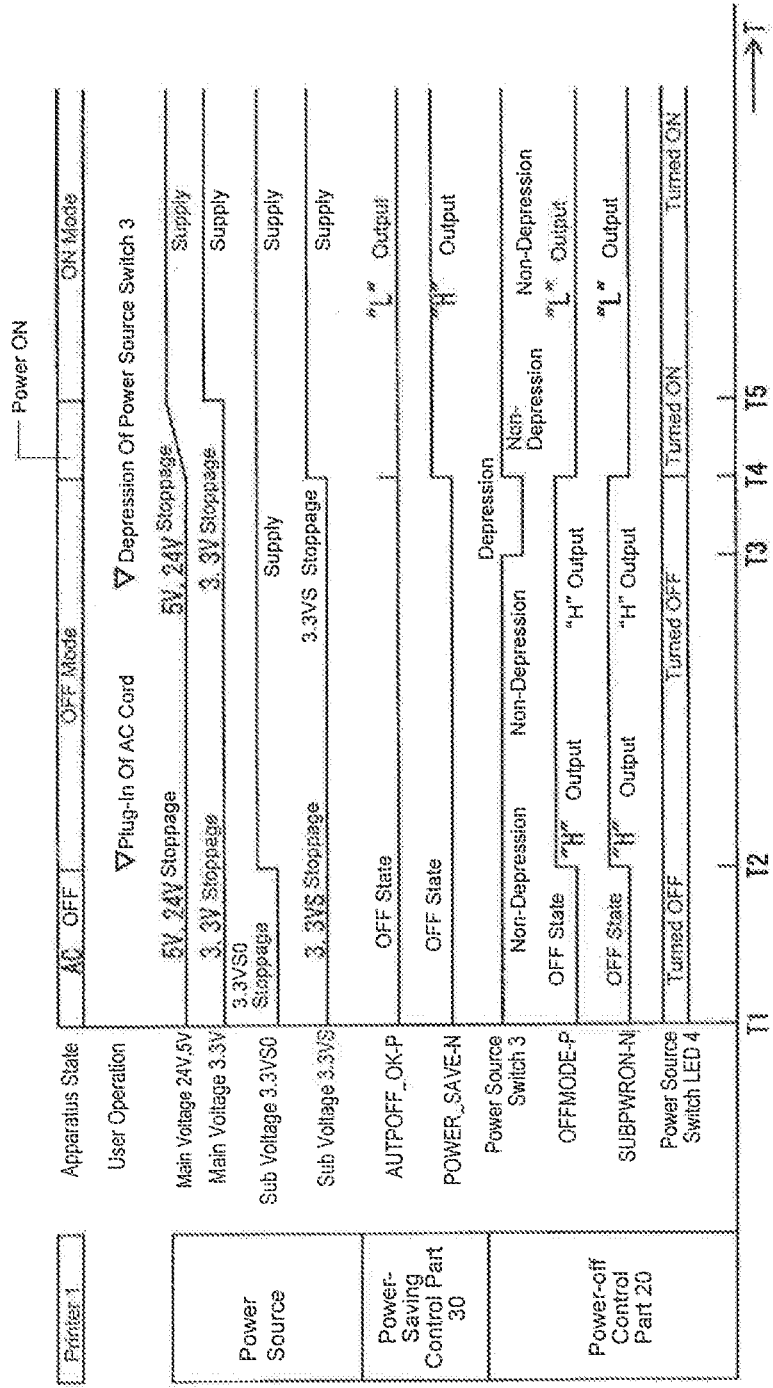

FIG. 4 is a timing chart of an operation after a power source of the printer 1 in FIG. 1 is turned on.

Figure 5:
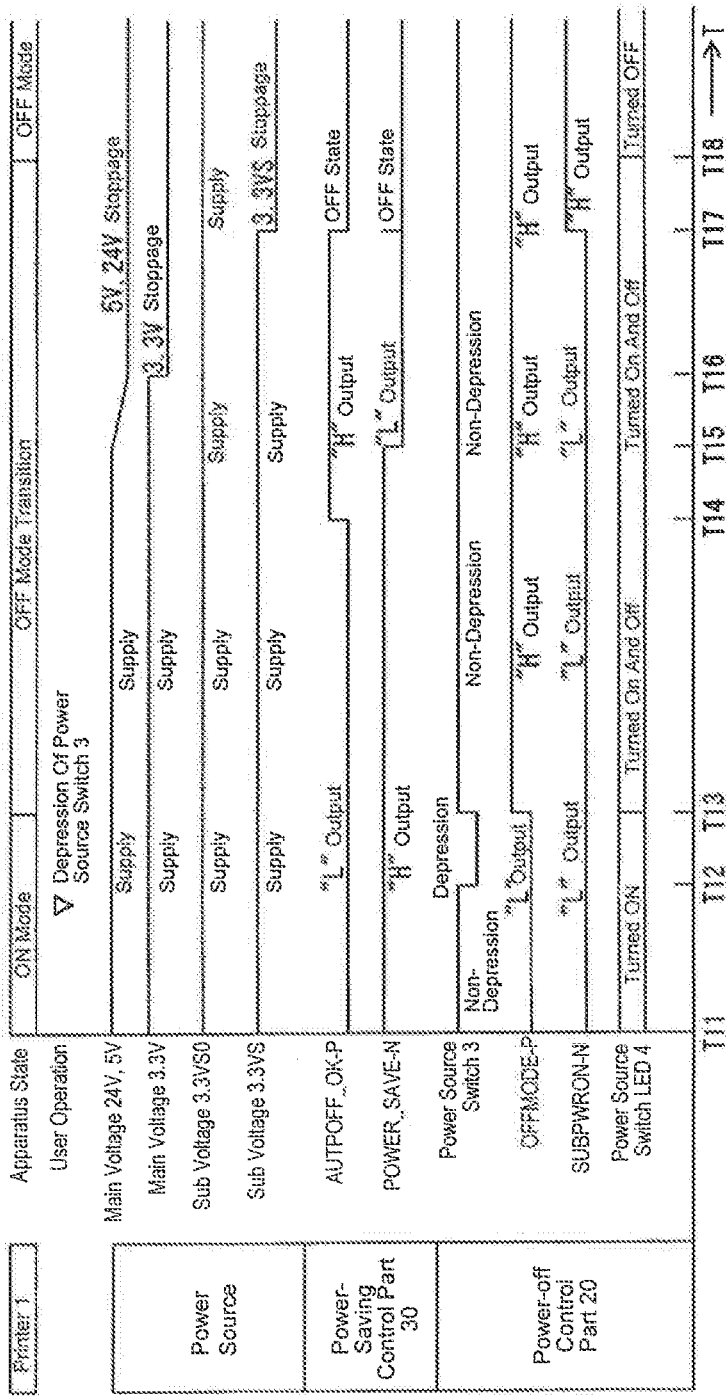
FIG. 5 is a timing chart of a power-source-off operation when the printer in FIG. 1 is in an ON mode.

In FIG. 4, T (T1, T2 . . . and the like) represents time. FIG. 5 and the time charts described later are similar to FIG. 4.

At the time T1, an AC code of the AC power source 90 is unplugged and power is not provided to the printer 1. At this time, the apparatus state is AC OFF state, and all of the main voltages 24V, 5V, and the main voltage 3.3V, the sub voltage 3.3VS0 and the sub voltage 3.3VS are in the stop state. The request signal OFFMODE-P, the permission signal AUTOOFF_OK-P, the first switching signal SUBPWRON-N, and the second switching signal POWERSAVE-N are the OFF state since power is not supplied to the power-off control part 20 and the power-saving control part 30.

At the time T2, the AC cord is plugged in by user operation, and the AC voltage 90a is supplied from the AC power source 90. Therefore, the sub voltage 3.3VS0 is supplied to the power-off control part 20, and the request signal OFF-MODE-P and the first switching signal SUBPWRON-N turns into "H." Since the first switching signal SUBPWRON-N turns into "H", the PchFET 2 is turned off, and the sub voltage 3.3VS is not supplied to the power-saving control part 30. At this time, the apparatus state shifts to the OFF mode.

At the time T3, the power source switch 3 is depressed by user operation. At the time T4, the power-off control part 20 detects that the power source switch 3 is depressed for a short time, and outputs the first switching signal SUBPWRON-N "L." Thereby, the PchFET 2 is turned on, and the sub voltage 3.3VS is supplied to the power-saving control part 30. The power-saving control part 30 outputs the second switching signal POWERSAVE-N "H." Thereby, the relay circuit 13 is turned on and the power supply to the main AC/DC converter circuit 12 is started. The power-off control part 20 turns on the power source switch LED 4. The apparatus state shifts to the ON mode. At the time T5, the main voltages 24V, 5V and the main voltage 3.3V are supplied to the printer control par't 40. Thereby, the apparatus state shifts to the ON mode.

FIG. 5 is a timing chart of a power-source-off operation when the printer 1 in FIG. 1 is in the ON mode.

At the time T11, the apparatus state is in the ON mode and all of the power is supplied. At the time T12, the power source switch 3 is depressed by user operation. At the time T13, the power-off control part 20 detects that the power source switch 3 is depressed for a short time, and outputs the request signal OFFMODE-P "H" that requests stoppage of the main voltages 24V, 5V and the main voltage 3.3V. Thereby, the power-saving control part 30 instructs the printer control part 40 to perform the shutdown process. The power-off control part 20 turns on and off the power source switch LED 4.

At the time T14, the power-saving control part 30 receives the notification of the completion of the shutdown from the printer control part 40 though the signal line 20c, and outputs the permission signal AUTOOFF_OK-P "H" that permits stoppage of the sub voltage 3.3VS0. At the time T15, the power-saving control part 30 outputs the second switching signal POWERSAVE-N "L." Thereby, the decrease of the output of the main voltages 24V and 5V is started. At this time, the signal POWERSAVE-N is input to the power-off control part 20, and the power-off control part 20 monitors that the signal POWERSAVE-N is output with the signal line B.

At the time T16, the supply of the main voltages 24V, 5V and the main voltage 3.3V is stopped. At the time T17, the power-off control part 20 detects stoppage of the main voltage 3.3V in the ADC 21 with the signal line A, and outputs the first switching signal SUBPWRON-N "H." Thereby, the supply of the sub voltage 3.3VS to the power-saving control part 30 is stopped. At this time, the power-off control part 20 monitors that the sub voltage 3.3VS is turned off with the signal line C. At the time T18, the power-off control part 20 turns off the power source switch LED 4. The apparatus state shifts to in the OFF mode.

Figure 6:
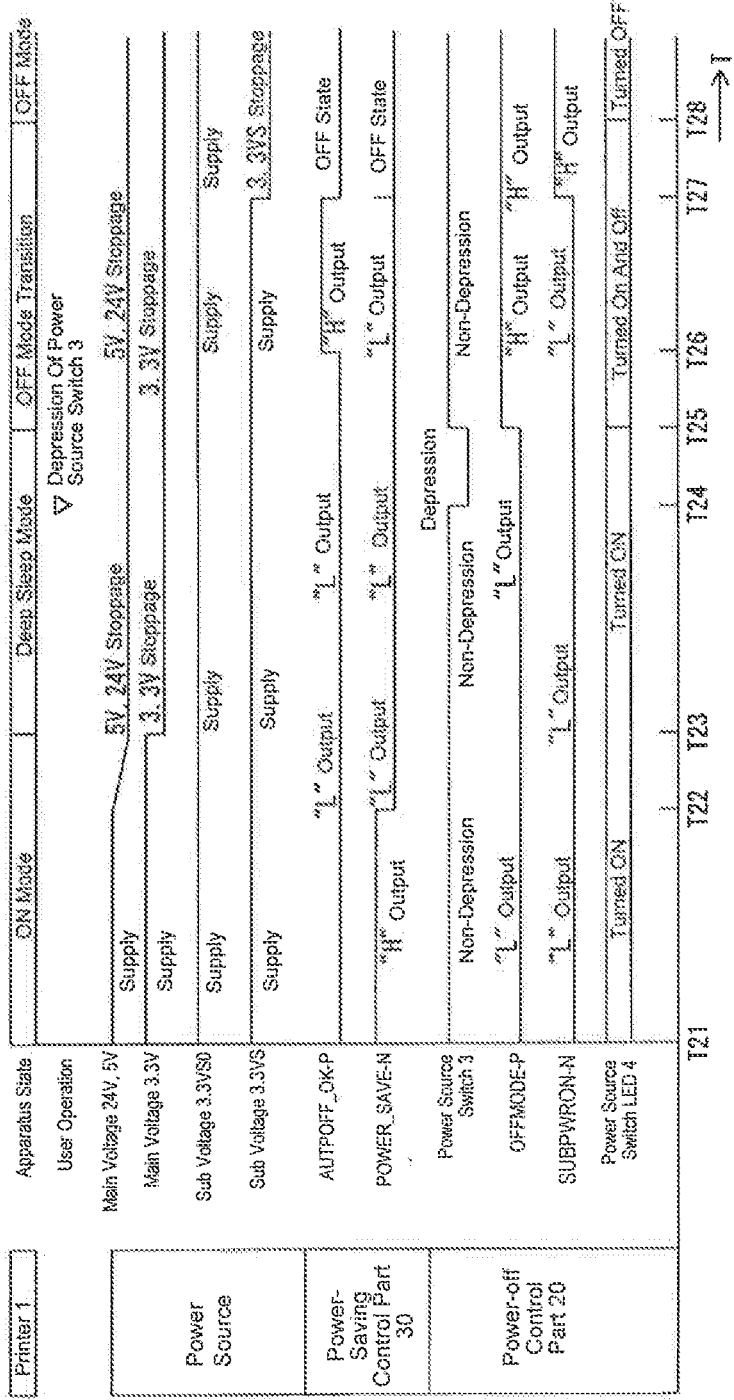
FIG. 6 is a timing chart of a power-source-off operation during a deep sleep mode of the printer in FIG. 1.

FIG. 6 is a timing chart of a power-source-off operation during the deep sleep mode of the printer 1 in FIG. 1.

At the time T21, the apparatus state is in the ON mode and all of the power is supplied. At the time T22, since 15 minutes of the deep sleep mode shift time has been counted, the power-saving control part 30 outputs the second switching signal POWERSAVE-N "L." Thereby, the decrease of the output of the main voltages 24V and 5V is started. At the time T23, the supply of the main voltages 24V, 5V and the main voltage 3.3V to the printer control part 40 is stopped. At this time, the sub voltage 3.3VS is supplied to the power-saving control part 30. The apparatus state shifts to the deep sleep mode.

At the time T24, the power source switch 3 is depressed by user operation. At the time T25, the power-off control part 20 detects that the power source switch 3 is depressed for a short time, and outputs the request signal OFFMODE-P "H" that requests stoppage of the main voltages 24V, 5V and the main voltage 3.3V.

At the time T26, the power-saving control part 30 outputs the permission signal AUTOOFF_OK-P "H" that permits stoppage of the sub voltage 3.3VS0. At the time T27, the power-off control part 20 outputs the first switching signal SUBPWRON-N "H." Thereby, the supply of the sub voltage 3.3VS to the power-saving control part 30 is stopped. At this time, the sub voltage 3.3VS0 is supplied to the power-off control part 20. At the time T28, the power-off control part 20 turns off the power source switch LED 4. The apparatus state shifts to the OFF mode.

FIG. 7 is a timing chart of an auto-off operation of the printer 1 in FIG. 1.

At the time T31, the apparatus state of the printer 1 is in the ON mode and all of the power is supplied. At the time T32, since 15 minutes of the deep sleep mode shift time has been counted, the power-saving control part 30 outputs the second switching signal POWERSAVE-N "L." Thereby, the decrease of the output of the main voltages 24V and 5V is started. At the time T33, the supply of the main voltages 24V, 5V and the main voltage 3.3V is stopped. As a result, the apparatus state shifts to the deep sleep mode.

At the time T34, 6 hours of the deep sleep mode shift time has been counted, and an auto-off shift condition is satisfied. Thereby, the power-saving control part 30 outputs the permission signal AUTOOFF_OK-P "H" that permits stoppage of the sub voltage 3.3VS0. At the time T35, the power-off control part 20 detects the permission signal AUTOOFF_OK-P "H," and turns on and off the power source switch LED 4. At the time T36, the power-off control part 20 outputs the first switching signal SUBPWRON-N "H." Thereby, the supply of the sub voltage 3.3VS to the power-saving control part 30 is stopped. At the time T37, the power-off control part 20 turns off the power source switch LED 4 and causes the apparatus state to transit to the OFF mode.

(Effects of the first embodiment)

According to the first embodiment, the power-saving control part 30 stops the supply the main voltages 24V, 5V and the main voltage 3.3V to the printer control part 40, and outputs the permission signal AUTOOFF_OK-P that permits stoppage of the sub voltage 3.3VS0 to the power-off control part 20. The power-off control part 20 is configured to input the permission signal AUTOOFF_OK-P, to stop the supply of the sub voltage 3.3VS to the power-saving control part 30 after confirming stoppage of the main voltage 3.3V, and to shift to the OFF mode. Therefore, there is an effect in which the auto power-off function is realized with a simple configuration.

[Second Embodiment]

(Configuration of Second Embodiment)

Figure 8:
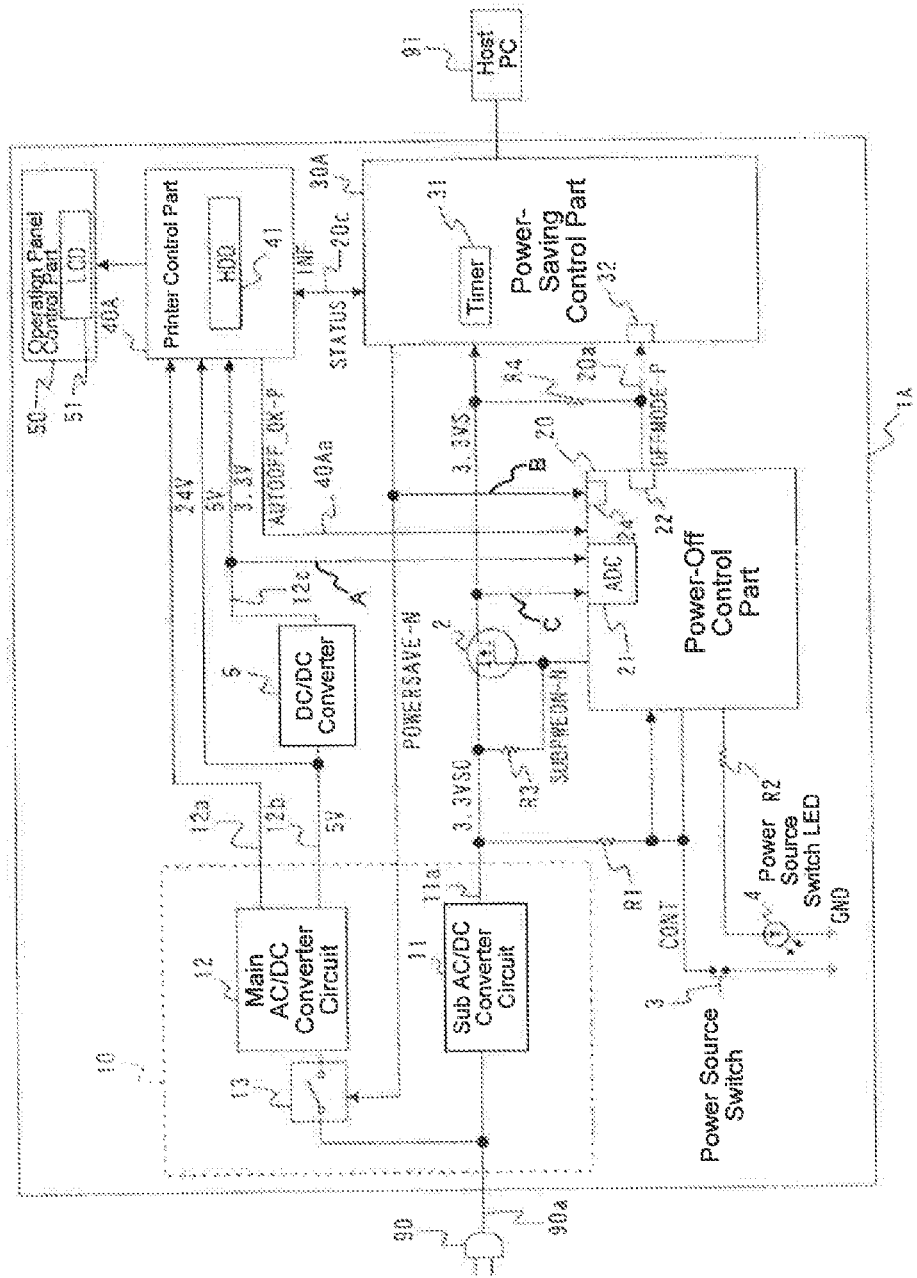
FIG. 8 is a schematic circuit view of a printer according to a second embodiment of the present invention.

FIG. 8 is a schematic circuit view of a printer 1A according to a second embodiment of the present invention. Components that are common with FIG. 1 illustrating the first embodiment are indicated with common symbols.

There is a problem in the configuration of the printer 1 of the first embodiment that a state of the shutdown cannot be displayed to the user since the power-off control part 20 stops the sub voltage 3.3VS immediately in the case when the power source switch 3 is depressed, which requests the power-off during the deep sleep mode or in the case when a condition for the auto power-off is ready. The printer 1A of the second embodiment to which an operation panel control part 50 is added is configured to display that the shutdown is being performed.

The configuration of the printer 1A in the second embodiment is similar to the configuration of the first embodiment. The second embodiment has differences that the power-saving control part 30 and the printer control part 40 of the first embodiment are replaced with a power-saving control part 30A and a printer control part 40A, and that the signal line 20b that transmits the permission signal AUTOOFF$_{13}$ OK-P from the power-saving control part 30 to the power-off control part 20 is removed and a signal line 40Aa as a second instruction part that transmits the permission signal AUTOOFF$_{13}$ OK-P from the printer control part 40A to the power-off control part 20 is added.

Moreover, the second embodiment has a difference that the operation panel control part 50 is newly connected to the printer control part 40A. The operation panel control part 50 includes a liquid crystal display part (hereinafter referred to as "LCD") 51 as a display part that displays the state of the printer 1A.

(Operation of Second Embodiment)

Figure 9:
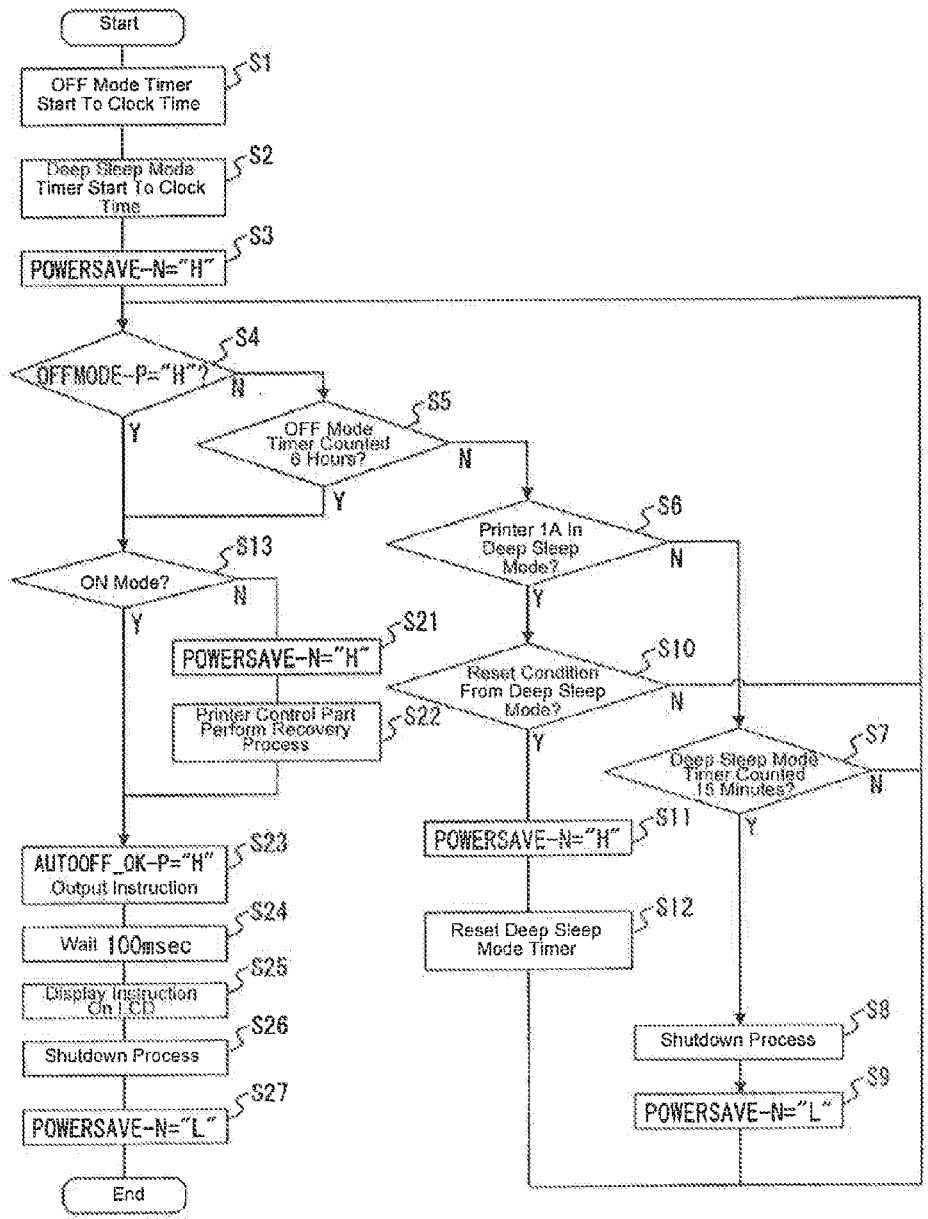
FIG. 9 is a flow diagram of an operation of a power-saving control part in FIG. 8.

FIG. 9 is a flow diagram of an operation of a power-saving control part 30A in FIG. 8. Steps that are common with those of FIG. 3 illustrating the first embodiment are indicated with common symbols.

S1 to S13 in FIG. 9 are steps that perform the same operations as the power-saving control part 30 of the first embodiment illustrated in FIGS. 3. S21 to S27 are steps that perform different operations from those of the first embodiment.

In S13, same as the first embodiment, the power-saving control part 30A judges whether or not an apparatus state is in the ON mode. The power-saving control part 30A shifts to S23 in the case when the apparatus state is in the ON mode. The power-saving control part 30A shifts to S21 in the case when the apparatus state is not in the ON mode.

In S21, the power-saving control part 30A outputs the second switching signal POWERSAVE-N, and shifts to S22. As a result, the main voltages 24V, 5V and the main voltage 3.3V are supplied to the printer control part 40A. In S22, the printer control part 40A performs a recovery process. In S23, the power-saving control part 30A outputs a notification signal INF that asks the printer control part 40A to output the permission signal AUTOOFF_OK-P "H" that permits stoppage of the sub voltage 3.3VS0 through the signal line 20c as a second notification part, and shifts to S24.

In S24, the power-saving control part 30A waits for 100 milliseconds. Then, the power-saving control part 30A shifts to S25. In S25, the power-saving control part 30A instructs to the printer control part 40A to display that the shutdown process is being performed on the LCD 51, and shifts to S26. In S26, the printer control part 40A performs the shunt process of the control parameters to the memory, the shutdown process for a completion process of HDD 41 and the like. Then, the power-saving control part 30A shifts to S27. In S27, power-saving control part 30A outputs the second switching signal POWERSAVE-N "L," and completes the process.

Figure 10:
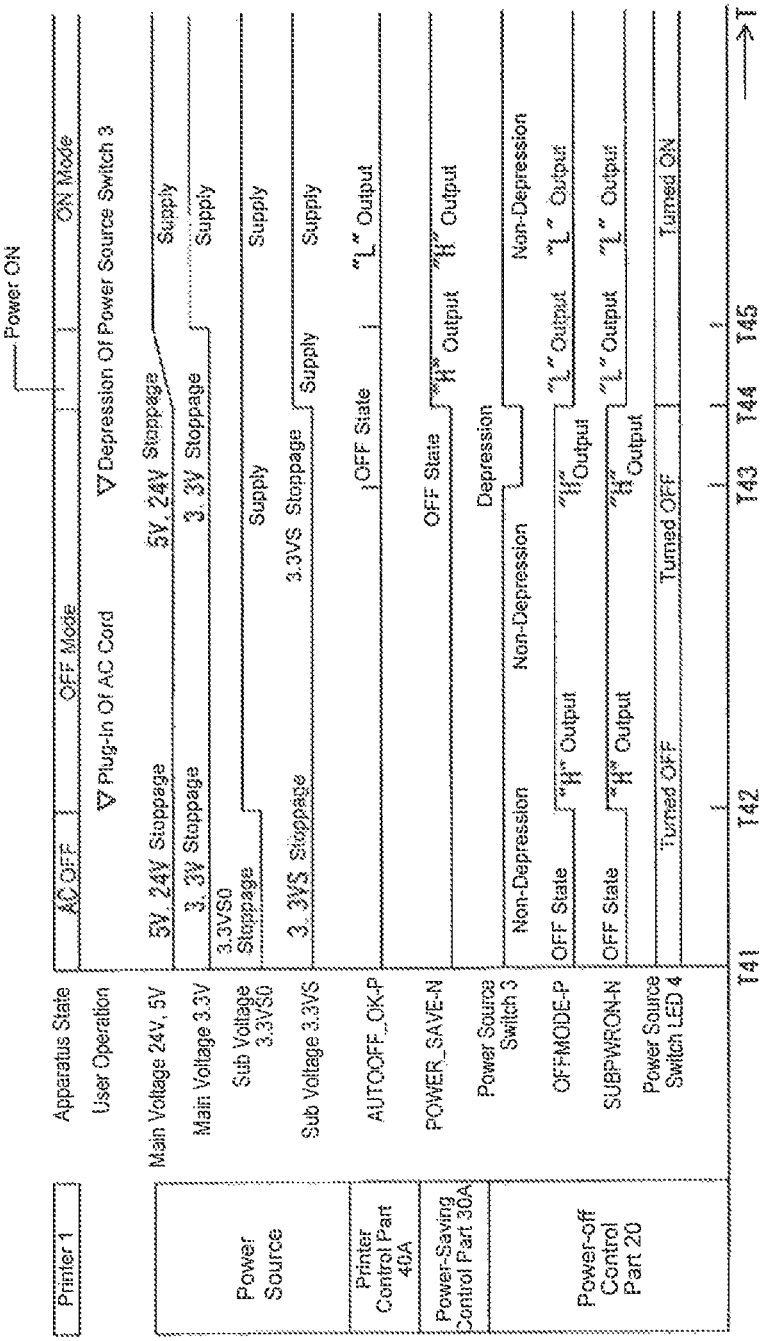

FIG. 10 is a timing chart of an operation after a power source of the printer 1A in FIG. 8 is turned on.

The operation illustrated in FIG. 10 after the power source of the printer 1A of the second embodiment is turned on is the same as the operation illustrated in FIG. 4 after the power source of the printer 1 of the first embodiment is turned on.

Figure 11:
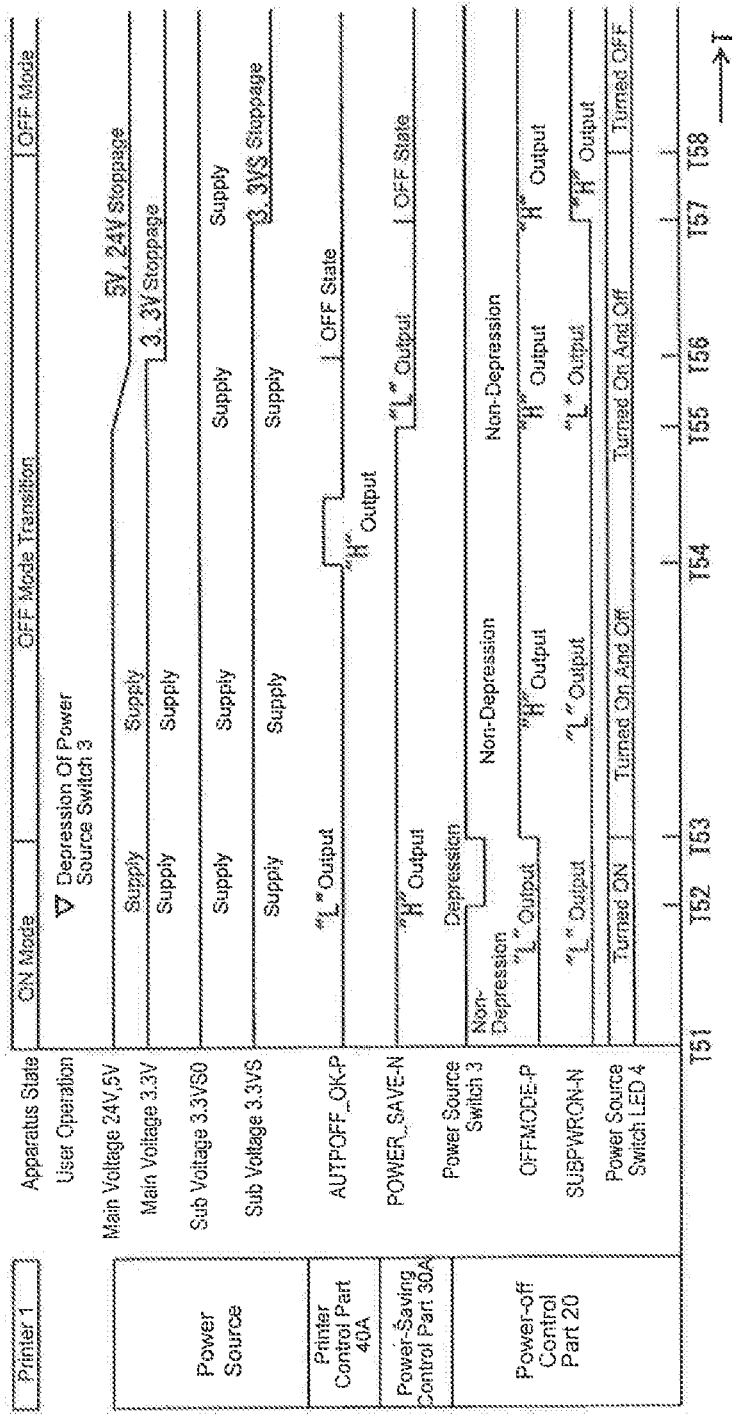
FIG. 11 is a timing chart of a power-source-off operation when the printer in FIG. 8 is in the ON mode.

FIG. 11 is a timing chart of a power-source-off operation when the printer 1A in FIG. 8 is in the ON mode.

The power-source-off operation illustrated in FIG. 11 during the operation of the printer 1A of the second embodiment is almost the same as the operation illustrated in FIG. 5 of the printer 1 of the first embodiment. The operation at the time T54 is different from that of the first embodiment. That is, the operation at the time T51 in FIG. 11 is the same as the operation at the time T11 in FIG. 5. Hereinafter, in the same as described above, the operation at the time T52 in FIG. 11 is the same as the operation at the time T12 in FIG. 5. The operation at the time T53 in FIG. 11 is the same as the operation at the time T13 in FIG. 5. The operation at the time T55 in FIG. 11 is the same as the operation at the time T15 in FIG. 5. The operation at the time T56 in FIG. 11 is the same as the operation at the time T16 in FIG. 5. The operation at the time T57 in FIG. 11 is the same as the operation at the time T17 in FIG. 5. The operation at the time T58 in FIG. 11 is the same as the operation at the time T18 in FIG. 5.

Hereinafter, the operation at the time T54, including the operation at the time before and after the time T54, different from the first embodiment are explained.

At the time T53, the power-off control part 20 detects that the power source switch 3 is depressed for a short time, and outputs the request signal OFFMODE-P "H." At the time T54, the power-saving control part 30A notifies the printer control part 40A to output the permission signal AUTOFF$_{13}$ OK-P "H" that permits stoppage of the sub voltage 3.3VS0 though the signal line 20c with the notification signal INF, and the printer control part 40A outputs the permission signal AUTOFF$_{13}$ OK-P through the signal line 40Aa.

Moreover, the power-saving control part 30A notifies the printer control part 40A to display that the shutdown process is being performed on the LCD 51 with the notification signal INF, and the printer control part 40A displays that the shutdown process is being performed on the LCD 51. At the time T55, the power-saving control part 30A outputs the second switch signal POWERSAVE-N "L." Thereby, the decrease of the output of the main voltages 24V and 5V is started. At this time, the power-off control part 20 monitors that the POWERSAVE-N is output with the signal line B. Hereinafter, the operation is the same as that of the first embodiment illustrated in FIG. 5.

Figure 12:
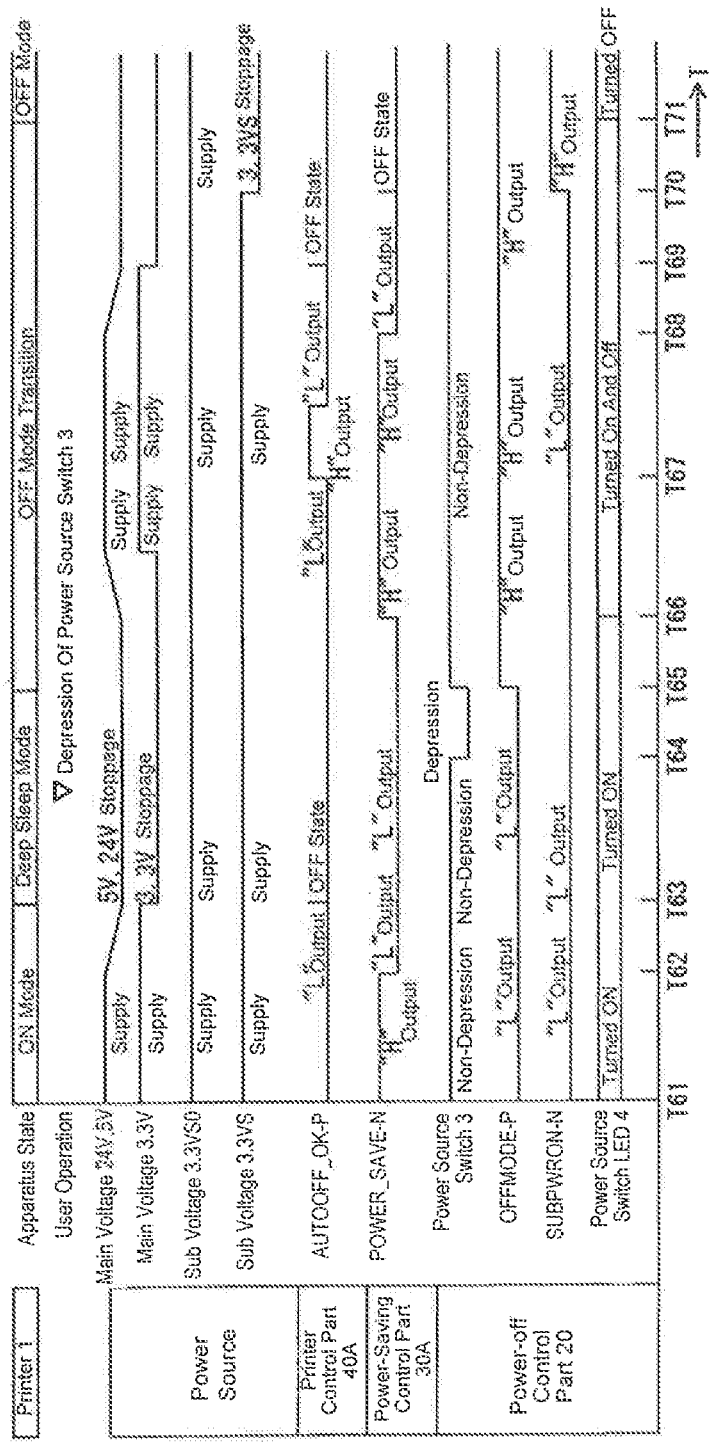
FIG. 12 is a timing chart of a power-source-off operation during the deep sleep mode of the printer in FIG. 8.

FIG. 12 is a timing chart of a power-source-off operation during the deep sleep mode of the printer 1A in FIG. 8.

At the time T61, the apparatus state of the printer 1A is in the ON mode, and all of the power is supplied. At the time T62, since 15 minutes of the deep sleep mode shift time has been counted, the power-saving control part 30A outputs the second switching signal POWERSAVE-N "L." Thereby, the decrease of the output of the main voltages 24V and 5V is started.

At the time T63, the supply of the main voltages 24V, 5V and the main voltage 3.3V to the printer control part 40A is stopped. The apparatus state of the printer 1A shifts to the deep sleep mode. At the time T64, the power source switch 3 is depressed by user operation. At the time T65, the power-off control part 20 detects that the power source switch 3 is depressed for a short time, and outputs the request signal OFFMODE-P "H" that requests stoppage of the main voltages 24V, 5V and the main voltage 3.3V.

At the time T66, the power-saving control part 30A outputs the second switching signal POWERSAVE-N "H." Thereby, the supply of the main voltages 24V, 5V and the main voltage 3.3VS0 is started. At the time T67, the power-saving control part 30A instructs the printer control part 40A to perform the shutdown, and notifies the printer control part 40A to output the permission signal AUTOFF$_{13}$ OK-P "H" that permits stoppage of the sub voltage 3.3VS0 with the notification signal INF, and the printer control part 40A outputs the permission signal AUTOFF_OK-P "H" to the power-off control part 20. Moreover, the power-saving control part 30A instructs the printer control part 40A to display that the shutdown process is being performed on the LCD 51, and the printer control part 40A displays that the shutdown process is being performed on the LCD 51.

At the time T68, the power-saving control part 30A receives the notification of the completion of the shutdown from the printer control part 40A, and outputs the second switch signal POWERSAVE-N "L." Thereby, the decrease of the output of the main voltages 24V and 5V is started. At the time T69, the main voltage 3.3V is stopped. At the time T70, the power-off control part 20 detects stoppage of the main voltage 3.3V, and outputs the first switching signal SUBP-WRON-N "H." Thereby, the supply of the sub voltage 3.3VS to the power-saving control part 30A is stopped. At the time T71, the power-off control part 20 turns the power source off switch LED 4. The apparatus state shifts to the OFF mode.

Figure 13:
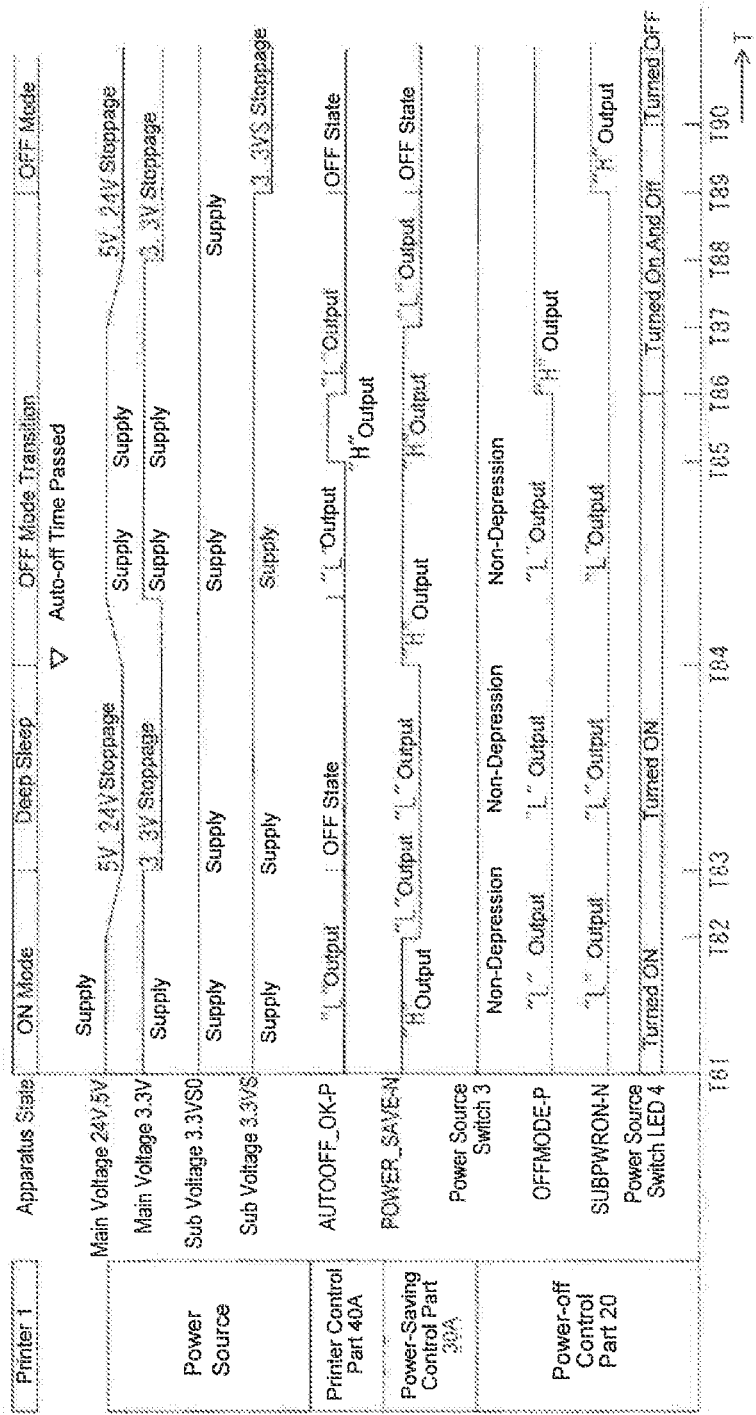
FIG. 13 is a timing chart of an auto-off operation of the printer in FIG. 8.

FIG. 13 is a timing chart of an auto-off operation of the printer 1A in FIG. 8.

At the time T81, the apparatus state of the printer 1A is in the ON mode, and all of the power is supplied. At the time T82, since 15 minutes of the deep sleep mode shift time has been counted, the power-saving control part 30A outputs the second switching signal POWERSAVE-N "L." Thereby, the decrease of the output of the main voltages 24V and 5V is started. At the time T83, the supply of the main voltages 24V, 5V and the main voltage 3.3V to the printer control part 40A is stopped. The apparatus state shifts to the deep sleep mode. At the time T84, the deep sleep mode continues for six hours, and the auto-off shift condition is satisfied. Thereby, the power-saving control part 30A outputs the second switching signal POWERSAVE-N "H." Thereby, the supply of the main voltages 24V, 5V and the main voltage 3.3V to the printer control part 40A is started.

At the time T85, the power-saving control part 30A notifies the printer control part 40A of the shutdown with the notification signal INF, and instructs the printer control part 40A to output the permission signal AUTOOFF_OK-P "H" that permits stoppage of the sub voltage 3.3VS0. The printer control part 40A outputs the permission signal AUTOOFF_OK-P "H" to the power-off control part 20. Moreover, the power-saving control part 30A instructs to the printer control part 40A to display that the shutdown process is being performed on the LCD 51, and the printer control part 40A displays that the shutdown process is being performed on the LCD 51.

At the time T86, the power-off control part 20 outputs the request signal OFFMODE-P "H" that requests stoppage of the main voltages 24V, 5V and the main voltage 3.3V.

At the time T87, the power-saving control part 30A outputs the second switch signal POWERSAVE-N "L." Thereby, the decrease of the output of the main voltages 24V and 5V is started. At the time T88, the supply of the main voltages 24V, 5V and the main voltage 3.3V is stopped. At the time T89, the power-off control part 20 detects stoppage of the main voltage 3.3V in the ADC 21, and outputs the first switching signal SUBPWRON-N "H." Thereby, the supply of the sub voltage 3.3VS to the power-saving control part 30A is stopped. At the time T90, the power-off control part 20 turns off the power source switch LED 4. The apparatus state shifts to the OFF mode.

(Effects of the Second Embodiment)

According to the printer 1A of the second embodiment, in addition to the effects of the first embodiment, the power-saving control part 30A causes the printer control part 40A that moves with the main voltages 24V, 5V and 3.3V to display that the printer control part 40A is shutting down, and outputs the permission signal AUTOOFF_OK-P that permits stoppage of the sub voltage 3.3VS0 to the power-off control part 20 after the shutdown is completed. The power-off control part 20 is configured to input the permission signal AUTOOFF_OK-P, to confirm stoppage of the main voltage 3.3V, to stop the supply of the sub voltage 3.3VS0 to the power-saving control part 30A, and to shift to the OFF mode. Therefore, the convenience for a user is improved since the user finds that the printer 1A is shutting down.

(Modification)

The present invention is not limited to the above-described embodiments, and other various forms and modifications are possible. For example, the first and second embodiments are explained with the printers 1 and 1A as electronic devices, as examples. However, the embodiments may be widely used in electronic devices such as personal computers, facsimile machines, photocopy machines and the like with a sub power source type power source.

The frequencies of On/Off of the power source switch LED varies according to embodiments. At 1 Hz, 3 Hz and in a preferred range, the frequency may be determined.

What is claimed is:

1. An electronic device, comprising:
   a first voltage output part configured to receive an alternating current voltage, convert the alternating current voltage to a first voltage, and output the first voltage;
   a second voltage output part configured to receive the alternating current voltage, convert the alternating current voltage to a second voltage whose voltage value is different from a voltage value of the first voltage, and output the second voltage;
   a first controller configured to receive the first voltage supplied from the first voltage output part;
   a second controller configured to receive the first voltage supplied from the first voltage output part; and
   a third controller configured to receive the second voltage supplied from the second voltage output part, wherein
   the first controller stops the supply of the first voltage to the second controller by the first voltage output part after the supply of the second voltage to the third controller by the second voltage output part has been stopped.

2. The electronic device of claim 1, wherein
   the first controller includes an input part configured to receive an output state of the second voltage output part.

3. The electronic device of claim 1, wherein
   the first controller includes an input part configured to receive an output state of a signal from the second controller to the third controller for stoppage of the supply of the voltage supplied by the second voltage output part.

4. The electronic device of claim 1, wherein
   the first controller includes an input part configured to receive an output state of the first voltage output part.

5. The electronic device of claim 1, wherein
   the first controller stops the supply of the first voltage to the second controller after the first controller receives a stop instruction from the second controller.

6. The electronic device of claim 1, further comprising:
   a switch part configured to manually turn on and off a control signal to the first controller;
   a first supply part controlled by the first controller and configured to supply the first voltage to the second controller;
   a first notification part configured to provide a notification of a request of state change of the first supply part from the first controller to the second controller; and
   a first instruction part configured to allow the second controller to instruct the first controller to perform a state change of the first supply part, wherein
   the first controller provides a notification of a stop request of the first supply part to the second controller by the first notification part based on the control signal of the switch part, and
   the second controller performs a stop instruction of the first supply part by the first instruction part after the second controller has been notified of the stop request of the first supply part.

7. The electronic device of claim 6, further comprising:
   a second supply part controlled by the second controller and configured to supply the second voltage to the third controller, wherein
   the second controller performs the stop instruction of the first supply part and stops the second supply part after the second controller has been notified of the stop request of the first supply part.

8. The electronic device of claim 7, wherein
   the first controller stops the supply of the first voltage to the second controller after the first controller receives a stop instruction from the third controller.

9. The electronic device of claim 8, wherein
   the second controller provides a notification of a stop request of the first supply part by a second notification part after the second controller has been notified of the stop request of the first supply part from the first controller by the first notification part.

10. The electronic device of claim 9, further comprising:
    a switch part configured to manually turn on and off a control signal to the first controller; wherein
    the first controller provides a notification of a state change of the first supply part to the second controller by the first notification part based on the control signal of the switch part.

11. The electronic device of claim 8, wherein
    the second controller stops the second supply part after the second controller has notified of a stop request of the first supply part by a second notification part.

12. The electronic device of claim 1, further comprising:
    a display part controlled by the third controller, wherein
    the third controller displays an apparatus state on the display part in a process in which the supply from the second voltage output part is stopped.

13. The electronic device of claim 1, wherein the first voltage is a sub voltage and the second voltage is a main voltage.

14. An image forming apparatus, comprising: the electronic device of claim 1.

15. The electronic device of claim 1, further comprising:
a first supply part controlled by the first controller and configured to receive the first voltage from the first voltage output part and supply the first voltage to the second controller; and
a second supply part controlled by the second controller and configured to receive the alternating current voltage from an alternating current power source and supply the alternating current voltage to the second voltage output part,
wherein the second controller makes the second supply part stop supplying the second voltage to the third controller by stopping supplying the alternating current voltage to the second voltage output part, and the first controller makes the first supply part stop supplying the first voltage that is supplied from the first voltage output part to the second controller.

16. The electronic device of claim 15, further comprising:
a third voltage output part configured to receive the second voltage from the second voltage output part, convert the second voltage to a third voltage, and supply the third voltage to the third controller; and
a monitoring part configured to detect a supply of the third voltage that the third voltage output part supplies,
wherein the first controller makes the first supply part stop supplying the first voltage to the second controller based on a result of the detection by the monitoring part.

17. An electronic device, comprising:
a first voltage output part configured to receive an alternating current voltage, convert the alternating current voltage to a first voltage, and output the first voltage;
a first controller configured to be operable upon receiving the first voltage;
a second controller in communication with the first controller and configured to be operable upon receiving the first voltage;
a second voltage output part configured to receive the alternating current voltage, convert the alternating current voltage to a second voltage whose voltage value is different from a voltage value of the first voltage, and output the second voltage; and
a third controller configured to be operable upon receiving the second voltage and to control an ON mode, wherein
the first controller and the second controller together configured to control an OFF mode and a deep sleep mode, and being configured to stop the first voltage output by the first voltage output part to the second controller after the second controller stops the second voltage output to the third controller.

18. The electronic device of claim 17, further comprising:
a switch part configured to manually turn on and off a control signal to the first controller;
a first supply part controlled by the first controller and configured to supply the first voltage to the second controller; and
a first notification part configured to provide a notification of a state change request for the first supply part from the first controller to the second controller, wherein
the second controller instructs the first controller to perform a state change of the first voltage supply part,
the first controller provides a notification of a stop request for the first supply part to the second controller based on the control signal of the switch part with the first notification part, and
the second controller performs a stop instruction for the first supply part with the first instruction part after the second controller has been notified of the stop request for the first supply part.

19. The electronic device of claim 17, further comprising:
a first supply part controlled by the first controller and configured to receive the first voltage from the first voltage output part and supply the first voltage to the second controller; and
a second supply part controlled by the second controller and configured to receive the alternating current voltage from an alternating current power source and supply the alternating current voltage to the second voltage output part,
wherein the second controller makes the second supply part stop supplying the second voltage to the third controller by stopping supplying the alternating current voltage to the second voltage output part, and the first controller makes the first supply part stop supplying the first voltage that is supplied from the first voltage output part to the second controller.

20. The electronic device of claim 19, further comprising:
a third voltage output part configured to receive the second voltage from the second voltage output part, convert the second voltage to a third voltage, and supply the third voltage to the third controller; and
a monitoring part configured to detect a supply of the third voltage that the third voltage output part supplies,
wherein the first controller makes the first supply part stop supplying the first voltage to the second controller based on a result of the detection by the monitoring part.

* * * * *